United States Patent
Nelson et al.

(10) Patent No.: US 6,331,249 B1
(45) Date of Patent: Dec. 18, 2001

(54) APPARATUS AND METHOD FOR WASTEWATER NUTRIENT RECOVERY

(75) Inventors: Douglas J. Nelson, Hamilton; James E. Knight, Oswego; Mark C. Noga, Cayuga, all of NY (US)

(73) Assignee: Knight Treatment Systems, Inc., Oswego, NY (US)

(*) Notice: Subject to any disclaimer, the term of this patent is extended or adjusted under 35 U.S.C. 154(b) by 0 days.

(21) Appl. No.: 09/649,472

(22) Filed: Aug. 28, 2000

(51) Int. Cl.[7] .................................. C02F 1/42; C02F 3/30
(52) U.S. Cl. ...................... 210/610; 210/617; 210/630; 210/631; 210/669; 210/151; 210/170; 210/256; 210/266; 210/747; 210/903; 210/906
(58) Field of Search ...................... 210/605, 610, 210/617, 630, 631, 663, 669, 150, 151, 170, 202, 256, 266, 287, 747, 903, 906

(56) References Cited

U.S. PATENT DOCUMENTS

| | | |
|---|---|---|
| 4,279,753 | 7/1981 | Nielson et al. |
| 4,917,802 * | 4/1990 | Fukaya et al. ............... 210/906 |
| 4,933,076 * | 6/1990 | Oshima et al. ............... 210/151 |
| 5,185,080 | 2/1993 | Boyle. |
| 5,221,470 * | 6/1993 | McKinney ............... 210/151 |
| 5,318,699 * | 6/1994 | Robertson et al. ............... 210/151 |
| 5,330,651 * | 7/1994 | Robertson et al. ............... 210/903 |
| 5,462,666 * | 10/1995 | Kimmel ............... 210/631 |
| 5,531,894 | 7/1996 | Ball et al. . |
| 5,766,454 * | 6/1998 | Cox et al. ............... 210/202 |
| 5,876,606 * | 3/1999 | Blowes et al. ............... 210/906 |
| 5,908,555 * | 6/1999 | Reingel et al. ............... 210/617 |
| 6,080,314 | 6/2000 | Rose. |

* cited by examiner

*Primary Examiner*—Christopher Upton
(74) *Attorney, Agent, or Firm*—Bond, Schoeneck & King, LLP

(57) ABSTRACT

An apparatus for treating a secondary treated wastewater effluent. The apparatus comprises an anoxic first zone for accepting the secondary effluent wherein the first zone includes heterotrophic bacteria, a carbon source, and an outlet structure including a limestone aggregate. The apparatus further comprises a second zone including an entrance structure that is in fluid communication with the outlet structure and an exit structure in fluid communication with the second zone. The exit structure includes a cationic exchange medium wherein the exit structure discharges the effluent to a disposal mechanism such as a subsurface disposal field.

16 Claims, 1 Drawing Sheet

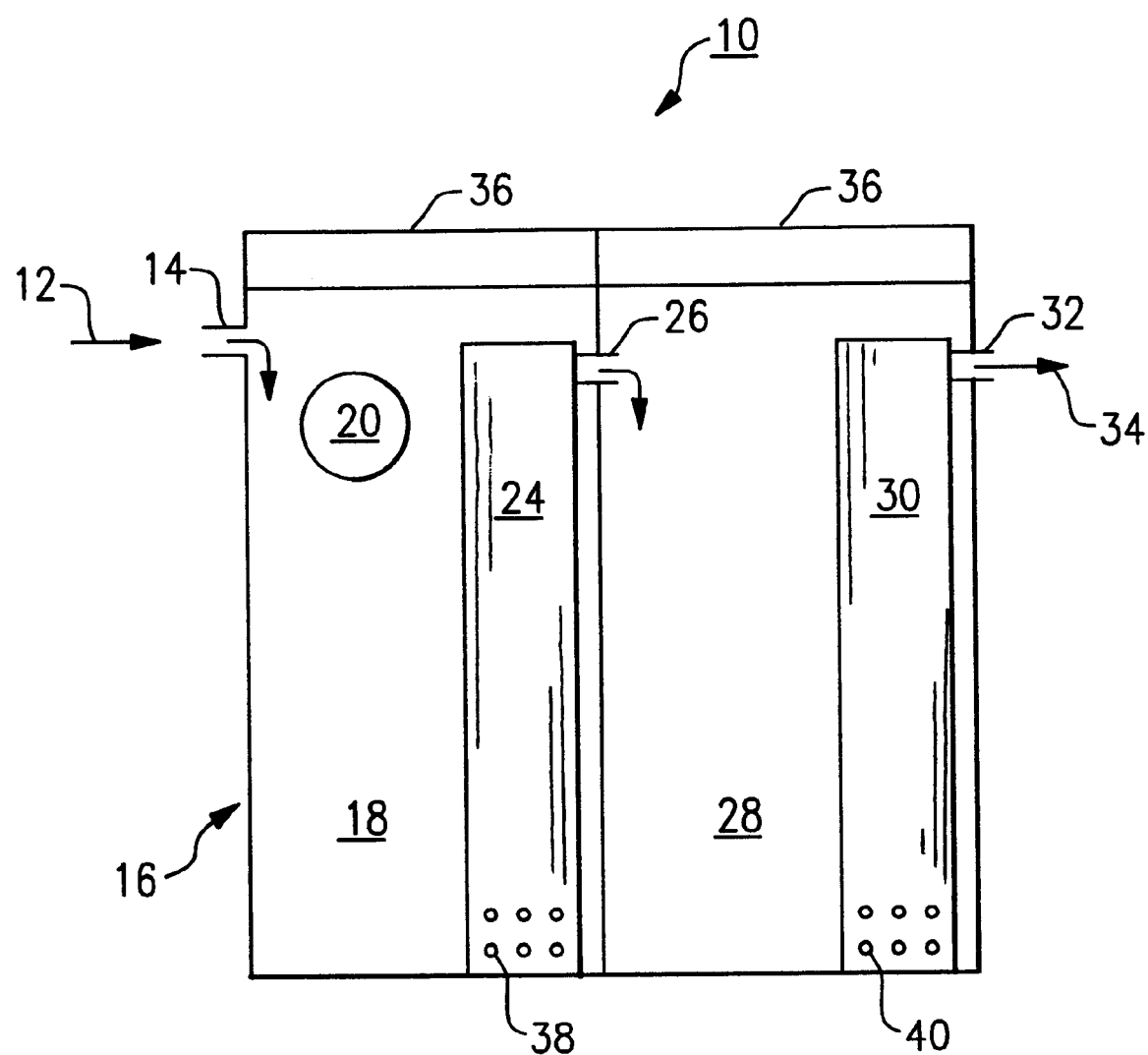

APPARATUS AND METHOD FOR WASTEWATER NUTRIENT RECOVERY

BACKGROUND OF THE INVENTION

This invention relates to wastewater treatment and more particularly to an apparatus and method for recovering nutrients from a residential or small commercial wastewater stream.

Wastewater from residential or small commercial sites commonly contain nitrogen and phosphorus. In most water bodies of the United States the limiting nutrients for the prevention of eutrification is nitrogen and/or phosphorus. In addition, nitrogen in drinking water is a health hazard due to associated diseases such as methemoglobinemia and others that have been linked to nitrogen in drinking water. From an environmental and public health perspective the discharge of micro and macro nutrients from wastewater sources must be prevented and there is a need for an efficient and economical method to remove these nutrients from the waste stream.

There are many prior art devices and processes for the removal of dissolved and suspended organic solids and nutrients from wastewater. For instance, U.S. Pat. No. 5,532,894 to Ball et al. describes a method of improving the quality of septic tank effluent which includes passing the effluent through an aerobic filter and recycling the effluent back into the septic tank. U.S. Pat. No. 5,185,080 to Boyle describes a system for the treatment of nitrate-containing wastewater by periodic addition of a Pseudomonas bacteria and a milk carbon source into an underground treatment chamber. U.S. Pat. No. 4,279,753 to Nielson et al. describes a method for the treatment of municipal or industrial wastewater that includes a multiple series of alternating aerobic-anaerobic bioreactors in series. U.S. Pat. No. 6,080,314 to Rose describes a zeolite septic leach bed system that provides for the removal of the nitrogen contaminants directly from the septic tank effluent.

Most of these and the other known processes are treatment methods that utilize the aerobic decomposition process to convert organic materials to biological solids that can then be removed from the waste stream though settling or filtration. These methods do not significantly lower the concentration of most micro and macro nutrients from the wastewater stream, specifically nitrogen and phosphorus.

There remains a need for a low cost, simple and easily maintained system to treat residential or small commercial waste streams to a very high quality before reintroduction back into the environment. It would be preferable to have a simple low cost system that can efficiently prevent the discharge of micro and macro nutrients into the environment, especially as part of an onlot treatment system typically found in residential or small commercial situations.

SUMMARY OF THE INVENTION

It is therefore an object of the invention to provide a simple low cost system to remove nutrients from residential or small commercial waste streams.

It is another object of the invention to provide a system that treats residential or small commercial wastewater that has previously been treated to commonly accepted secondary treatment standards (BOD/Suspended Solids of 30/30) prior to disposal in subsurface trenches or other treatment mechanism.

It is yet another object of the invention to provide a system to be included as one device in a series of treatment devices utilized to treat wastewater in an onlot or near lot system in order to further treat waste water that has been previously treated to remove BOD and convert ammonium ($NH_4$) and organic nitrogen compounds to nitrate ($NO_3$). The utilization of the present invention in connection with septic tanks will be a secondary application of the proposed process.

These and other objects are obtained by providing an apparatus for processing secondary treated wastewater effluent. The apparatus comprises an anoxic first zone for accepting the secondary wastewater effluent wherein the first zone includes heterotrophic bacteria, a carbon source, and an outlet structure including a limestone aggregate. The apparatus further comprises a second zone including an entrance structure that is in fluid communication with the outlet structure and an exit structure in fluid communication with the second zone. The exit structure includes a cationic exchange medium wherein the exit structure discharges the effluent to a disposal mechanism such as a subsurface disposal field.

BRIEF DESCRIPTION OF THE DRAWINGS

FIG. 1 is a schematic diagram of the present invention.

DETAILED DESCRIPTION OF THE INVENTION

Referring to FIG. 1, there is depicted a schematic diagram of the present invention. The system 10 consists of a two zone or chamber device 16 that is constructed of materials sufficient to be buried in a sub-surface location. Typical construction materials include steel, concrete, or plastic. The first chamber 18 accepts secondary effluent 12 from an aerobic process such as a aerobic treatment unit or other system that treats the effluent to commonly accepted secondary treatment standards. This wastewater is high in nitrate ($NO_3$), having had all organic nitrogen and ammonium ($NH_4$) converted to nitrate ($NO_3$) through the aerobic biological process. The first chamber 18 is maintains anoxic conditions which will promote the conversion of nitrate ($NO_3$) to Nitrite ($NO_2$) and ultimately to nitrogen gas ($N_2$).

Environmental conditions in the first chamber 18 are maintained to promote the growth of heterotrophic bactera in order to perform denitrification through biological conversion. In the preferred embodiment, the bacteria is a naturally occurring, soil-borne bacteria. One skilled in the art would recognize that there is a broad range of bacteria capable of performing the necessary conversion and the selection of the specific bacteria is dependent upon numerous factors, most importantly the ambient temperature of the location of the device. The bacteria utilize a carbon source in the process as part of their respiratory conversion. The carbon source is a natural organic material, preferably bark chips. Another choice for organic material is wood chips. The source of carbon can be suspended in the first chamber 18 either in a fixed container 20 or in a floating container. The container 20 is porous and allows for physical exchange of water as well as osmotic exchange of compounds through its walls. The organic material also allows a media for the growth of the heterotrophic bacteria for denitrification.

The wastewater then flows through an outlet structure 24 or filter cartridge that contains limestone aggregate. The wastewater enters the outlet structure 24 through holes 38 positioned in the lower part of the structure, preferably about 12 inches from the bottom of the first chamber 18. The aggregate attracts and adsorbs through cationic exchange a portion of the phosphorus remaining in the wastewater. The limestone may add alkalinity for pH adjustment or stabilization as the biological processes are carried out. This limestone aggregate also serves as a biological media filter as well as a physical filter for particulate matter. A majority of phosphorus in wastewater is contained in the cells of biological organism and the removal of particulate matter at this stage will significantly reduce the phosphorus content of the waste stream. The phosphorus contained in cells of biological organisms is often released in a soluble form as these organisms die. This dissolved phosphorus will pass from the first chamber 18 to the second zone or chamber 28 for further treatment.

The wastewater enters the second chamber 28 of the process through an entrance structure 26. This entrance structure 26 distributes the flow within the unit and limits the kinetic energy to avoid excessive flow velocities within the unit. The entrance structure 26 can take the form of a baffle or pipe. The entrance structure 26 creates a plug flow condition in the second chamber 28 in order to facilitate the second chamber 28 to serve as a settling area for any remaining particles.

The wastewater then passes out of the second chamber 28 through an exit filter or structure 30 that contains a brick aggregate that adsorbs through cationic exchange any remaining dissolved phosphorus and other nutrients in the wastewater. In the preferred embodiment, the exit structure 30 includes small intake holes 40. One skilled in the art would recognize that other materials that perform cationic exchange are suitable, such as clay pellets.

After passing through the exit structure 30 the water is discharged to a sub-surface mechanism or other disposal mechanism meeting local regulatory requirements. The discharged water has a significantly lower concentration of organic matter and nutrients than the wastewater flowing into the unit. The concentration of contaminants (for organic matter, suspended solids, nitrogen, and phosphorus) will be less than the Maximum Contaminant Levels for drinking water. The size of the sub-surface mechanism is generally based upon the strength of the wastewater being discharged. Hence, the size of this mechanism will be able to be reduced. In addition the distance that this mechanism must be separated from ground water or surface water areas will be greatly reduced due to the reduced need for the soil to treat contaminants.

The unit provides for periodic service for continued operation. The carbon source, limestone, and brick aggregate will all require replacement or regeneration to maintain their treatment capabilities. The carbon source will become biologically clogged and may require "resting" or cleaning to regenerate it to usefulness again. The limestone aggregate will eventually lose all of its ionic bonding sites and may become biologically clogged. Regeneration of this aggregate will require replacement of the ionic bonding sites to their original condition and physical removal of the biological growth from the aggregate. The brick aggregate will lose its efficiency over time and eventually the system will experience "breakout" of nutrients. At the time that breakout occurs the brick aggregate will need to be regenerated through a process to replace the ionic bonds to the original condition. Service access will be provided through risers 36 that are positioned above the two chambers 18 and 28. The risers 36 extend to the surface of the soil thereby allowing easy access for needed service.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An apparatus for treating a secondary wastewater effluent, the apparatus comprising:

an anoxic first zone for accepting the effluent, said first zone including heterotrophic bacteria, a carbon source, and an outlet structure including a limestone aggregate;

a second zone including an entrance structure, said entrance structure in fluid communication with said outlet structure; and, an exit structure in fluid communication with said second zone, said exit structure including a cationic exchange medium, wherein said exit structure discharges the effluent to a disposal mechanism.

2. The apparatus of claim 1 wherein said first and second zones comprise vessels constructed of a material sufficient for subsurface installation.

3. The apparatus of claim 2 further comprising risers affixed to said first and second chambers, said risers extending to ground level thereby allowing access to said chambers.

4. The apparatus of claim 1 wherein said heterotrophic bacteria comprises a naturally-occurring soil-borne bacteria.

5. The apparatus of claim 1 wherein said carbon source comprises bark chips.

6. The apparatus of claim 1 wherein said carbon source comprises wood chips.

7. The apparatus of claim 1 wherein said cationic exchange medium comprises brick aggregate.

8. The apparatus of claim 1 wherein said disposal mechanism comprises a sub-surface mechanism.

9. An method for treating a secondary treated wastewater effluent, the method comprising:

supplying a secondary wastewater effluent from an aerobic treatment process to an anoxic first zone for accepting the effluent, said first zone including heterotrophic bacteria, a carbon source, and an outlet structure including a limestone aggregate;

flowing said effluent through said outlet structure;

flowing said effluent into a second zone via an entrance structure, said entrance structure in fluid communication with said outlet structure;

flowing said effluent through an exit structure in fluid communication with said second zone, said exit structure including a cationic exchange medium;

discharging the effluent to a disposal mechanism.

10. The method of claim 9 wherein said first and second zones comprise vessels constructed of a material sufficient for subsurface installation.

11. The method of claim 10 wherein said first and second chambers include risers, said risers extending to ground level, the method further comprising the step of periodically replacing said carbon source, said limestone aggregrate, and said cationic exchange medium.

12. The method of claim 9 wherein said heterotrophic bacteria comprises a naturally-occurring soil-borne bacteria.

13. The method of claim 9 wherein said carbon source comprises bark chips.

14. The method of claim 9 wherein said carbon source comprises wood chips.

15. The method of claim 9 wherein said cationic exchange medium comprises brick aggregate.

16. The method of claim 9 wherein said disposal mechanism comprises a sub-surface mechanism.

* * * * *